United States Patent
Fujimoto et al.

(10) Patent No.: US 10,099,142 B2
(45) Date of Patent: Oct. 16, 2018

(54) VIDEO GAME PROCESSING PROGRAM AND VIDEO GAME PROCESSING SYSTEM

(71) Applicant: KABUSHIKI KAISHA SQUARE ENIX, Tokyo (JP)

(72) Inventors: Hiroki Fujimoto, Tokyo (JP); Takashi Tokita, Tokyo (JP); Hideo Iwasaki, Tokyo (JP); Kouki Takahashi, Hokkaido (JP); Kouhei Miyazaki, Tokyo (JP); Takuya Okada, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 126 days.

(21) Appl. No.: 15/007,437

(22) Filed: Jan. 27, 2016

(65) Prior Publication Data
US 2016/0214020 A1 Jul. 28, 2016

(30) Foreign Application Priority Data
Jan. 28, 2015 (JP) .................................. 2015-014101

(51) Int. Cl.
- *A63F 13/798* (2014.01)
- *A63F 13/795* (2014.01)
- *A63F 13/35* (2014.01)

(52) U.S. Cl.
CPC ............ *A63F 13/798* (2014.09); *A63F 13/35* (2014.09); *A63F 13/795* (2014.09)

(58) Field of Classification Search
USPC ......................................................... 463/29
See application file for complete search history.

(56) References Cited

U.S. PATENT DOCUMENTS

| | | | | |
|---|---|---|---|---|
| 7,419,424 B2* | 9/2008 | Gomez | ................... | G07F 17/32 273/143 R |
| 8,498,722 B2* | 7/2013 | Chung | ................. | H04N 21/274 463/16 |
| 2012/0309511 A1* | 12/2012 | Chung | ................. | H04N 21/274 463/30 |
| 2012/0309515 A1* | 12/2012 | Chung | ................. | H04N 21/274 463/31 |
| 2013/0143673 A1 | 6/2013 | Yamamoto | | |

(Continued)

FOREIGN PATENT DOCUMENTS

JP 2012-213515 11/2012

*Primary Examiner* — Pierre E Elisca
(74) *Attorney, Agent, or Firm* — Greenblum & Bernstein, P.L.C.

(57) ABSTRACT

A non-transitory computer-readable medium including a video game processing program product for causing a server to realize functions to create a rank regarding a video game for each of a plurality of users is provided. The functions includes: a managing function configured to manage the plurality of users in a state where the plurality of users is grouped into groups by every predetermined number; a creating function configured to respectively create ranks for the users in each of the groups; a setting function configured to set up grades for the users in each of the groups on the basis of the ranks of the users; a dividing function configured to divide the groups into a plurality of elements, the plurality of elements respectively corresponding to the grades; and a composing function configured to compose a new group using the plurality of elements.

20 Claims, 15 Drawing Sheets

(56) References Cited

U.S. PATENT DOCUMENTS

| | | | | |
|---|---|---|---|---|
| 2014/0004953 A1* | 1/2014 | Rama Rao | ............ | A63F 13/785 |
| | | | | 463/42 |
| 2014/0179424 A1* | 6/2014 | Perry | .................... | A63F 13/355 |
| | | | | 463/31 |
| 2014/0179440 A1* | 6/2014 | Perry | .................... | A63F 13/803 |
| | | | | 463/42 |

* cited by examiner

100: VIDEO GAME PROCESSING SYSTEM

GROUP INFORMATION

| RANK | GRADE | USER ID OF USER BELONGING GROUP 1 | USER ID OF USER BELONGING GROUP 2 | ... |
|---|---|---|---|---|
| 1 | A | U011 | U021 | ... |
| 2 | | U012 | U022 | ... |
| 3 | | U013 | U023 | ... |
| 4 | B | U014 | U024 | ... |
| 5 | | U015 | U025 | ... |
| 6 | | U016 | U026 | ... |
| 7 | C | U017 | U027 | ... |
| 8 | | U018 | U028 | ... |
| 9 | | U019 | U029 | ... |

VIDEO GAME PROCESSING PROGRAM AND VIDEO GAME PROCESSING SYSTEM

CROSS-REFERENCE TO RELATED APPLICATION

The present application relates to subject matter contained in Japanese Patent Application No. 2015-14101 field on Jan. 28, 2015, the disclosure of which is expressly incorporated herein by reference in its entirety.

BACKGROUND OF THE INVENTION

1. Field of the Invention

At least one of embodiments according to the present invention relates to a video game processing program and a video game processing system for causing a server to realize to create a rank regarding a video game for each of a plurality of users.

2. Description of the Related Art

Heretofore, various systems each of which provides ranking of a game result by a plurality of players to the respective players have been proposed.

In such a system, for example, there is one in which ranking limited to a part of game results is provided on the basis of positional information of a game terminal (see Japanese Patent Application Publication No. 2012-213515).

However, in the conventional system, there has been a problem that it may be difficult to cause a user to attract the ranking. Namely, there has been a problem that since some users do not attract a game result of other unfamiliar user, provision of ranking to such users hardly influences on a video game.

SUMMARY OF THE INVENTION

It is an object of at least one of embodiments according to the present invention to solve the problem described above, and to allow to create ranking capable of causing a user to attract his or her interest in a game result of other user.

According to a non-limiting aspect of the present invention, there is provided a non-transitory computer-readable medium including a video game processing program product for causing a server to realize functions to create a rank regarding a video game for each of a plurality of users. In this case, the functions includes: a managing function configured to manage the plurality of users in a state where the plurality of users is grouped into groups by every predetermined number; a creating function configured to respectively create ranks for the users in each of the groups; a setting function configured to set up grades for the users in each of the groups on the basis of the ranks of the users; a dividing function configured to divide the groups into a plurality of elements, the plurality of elements respectively corresponding to the grades; and a composing function configured to compose a new group using the plurality of elements.

According to a non-limiting aspect of the present invention, there is provided a video game processing system including a communication network, a server and a user terminal, the video game processing system configured to control progress of a video game by creating a rank regarding the video game for each of a plurality of users, the video game processing system including: a manager configured to manage the plurality of users in a state where the plurality of users is grouped into groups by every predetermined number; a creator configured to respectively create ranks for the users in each of the groups; a setter configured to set up grades for the users in each of the groups on the basis of the ranks of the users; a divider configured to divide the groups into a plurality of elements, the plurality of elements respectively corresponding to the grades; and a composer configured to compose a new group using the plurality of elements.

According to a non-limiting aspect of the present invention, there is provided a non-transitory computer-readable medium including a video game processing program product for causing a server to realize a first group of functions to create a rank regarding a video game for each of a plurality of users, the video game processing program further causing a user terminal to realize a second group of functions to carry out the video game, wherein the first group of functions includes: a managing function configured to manage the plurality of users in a state where the plurality of users is grouped into groups by every predetermined number; a creating function configured to respectively create ranks for the users in each of the groups; a setting function configured to set up grades for the users in each of the groups on the basis of the ranks of the users; a dividing function configured to divide the groups into a plurality of elements, the plurality of elements respectively corresponding to the grades; a composing function configured to compose a new group using the plurality of elements; and a transmitting function configured to transmit output information to the user terminal, the output information representing the new group, and wherein the second group of functions includes: a receiving function configured to receive the output information from the server.

According to each of the embodiments of the present application, one or two or more shortages are solved.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
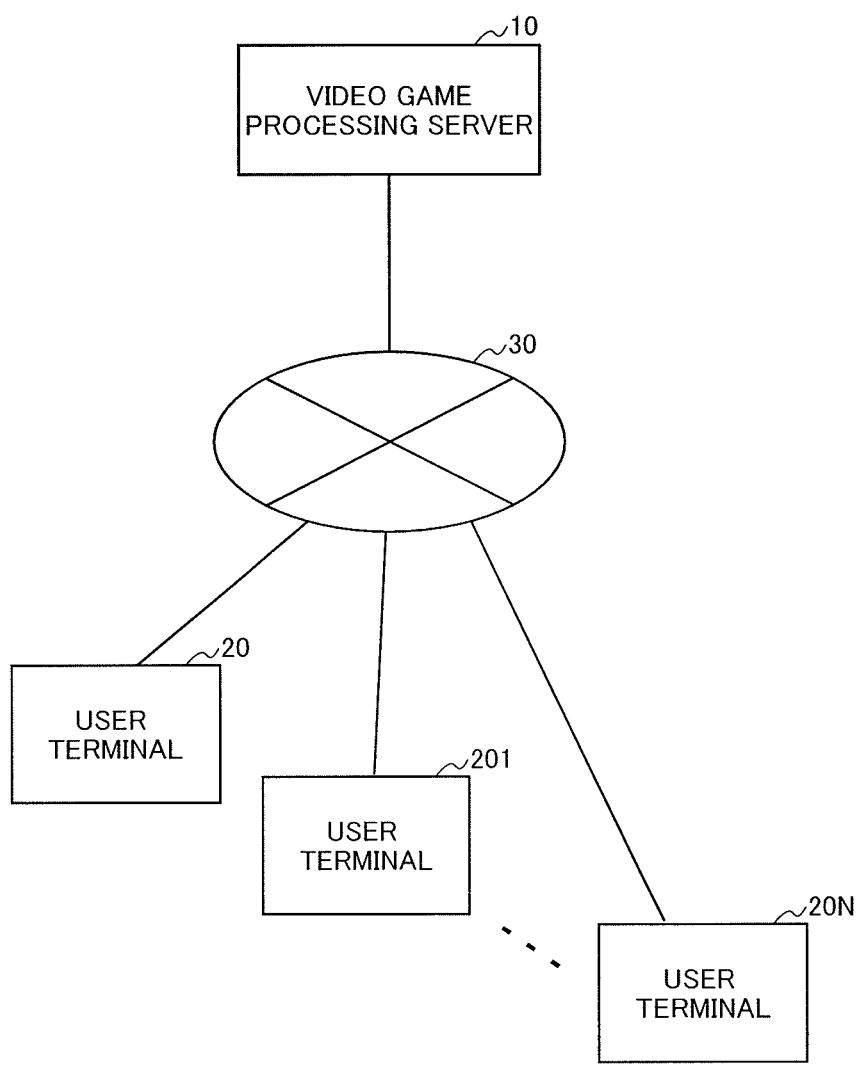
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10, and user terminals 20 and 201 to 20N ("N" is an arbitrary integer) respectively used by a plurality of users (players) who play a video game. In this regard, the configuration of the video game processing system 100 is not limited to this. The video game processing system 100 may be configured so that the plurality of users uses a single user terminal, or may be configured so as to include a plurality of servers.

Each of the video game processing server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the video game processing server 10 and the plurality of user terminals 20, 201 to 20N, whereby various kinds of functions for controlling progress of the video game in response to an operation of the user are realized.

The video game processing server 10 is managed by an administrator of the video game processing system 100, and has various kinds of functions to provide information regarding the video game to the plurality of user terminals 20, 201 to 20N. In the present embodiment, the video game processing server 10 is constructed by an information processing apparatus, such as a WWW server, and includes a storage medium for storing various kinds of information. In this regard, the video game processing server 10 is provided with a general configuration for carrying out the video game, such as a control section and a communicating section. However, its explanation herein is omitted. Further, in the video game processing system 100, it is preferable that the video game processing server 10 manages information regarding the video game from a point of view to reduce a processing load on each of the plurality of user terminals 20, 201 to 20N. However, the storage section for storing the various kinds of information may include a storage region with a state that the video game processing server 10 can access the storage region. For example, the video game processing server 10 may be configured so as to be provided with a dedicated storage region outside the video game processing server 10.

Figure 2:
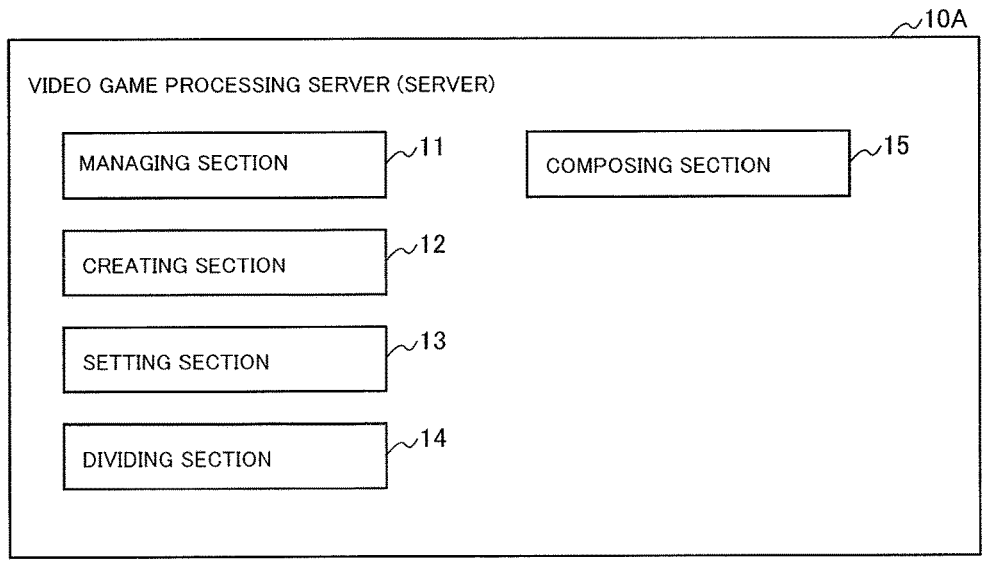
FIG. 2 is a block diagram showing a configuration of a video game processing server corresponding to at least one of the embodiments according to the present invention.

FIG. 2 is a block diagram showing a configuration of a video game processing server 10A (a server 10A) that is an example of the configuration of the video game processing server 10. The server 10A at least includes a managing section 11, a creating section 12, a setting section 13, a dividing section 14, and a composing section 15.

The managing section 11 has a function to manage the plurality of users in a state that the users are grouped by every predetermined number. Namely, in the video game the system 100, a plurality of groups constituted by the plurality of users can exist.

Here, the word "state that the users are grouped by every predetermined number" means a state that the plurality of users are associated with each other on the basis of a predetermined number of users. In the present embodiment, a case where participants of the video game controlled by the server 10A are divided every 50 users will be described as an example. In this regard, it is preferable that the predetermined number can be changed in view of a server load. For example, the predetermined number may of course be 100. Further, it may be configured so that the different number of users belongs to each of the plurality of groups.

Further, the word "manage a user" means that information regarding the user is managed. As examples of the word "manage", there are register and update of information regarding a user.

The creating section 12 has a function to create a rank regarding each of the plurality of users for every group.

Here, the word "rank regarding each of the plurality of users" means an order obtained by arranging the plurality of users in accordance with a predetermined rule. The method of creating the ranks is not limited particularly. However, it is preferable that the method is a method in which each of the users is allowed to recognize that a play result of the video game by each of the users is reflected. As an example of the method of creating the ranks, there is a method in which a rank is set up on the basis of the quantity of game elements acquired by each of the users in the video game (for example, the users are arranged in a decreasing order of the acquired game elements).

The setting section 13 has a function to set up grades regarding the plurality of users for every group on the basis of respective ranks.

Here, the grade regarding the plurality of users means steps of superiority or inferiority of each of the users. Namely, in a case where ranks are set up to all of the users who belong to the group, the setting section 13 sets up a grade to each of the users in accordance with a dedicated rule. In this regard, the configuration for setting up the grade is not limited particularly. However, it is preferable that the configuration is a configuration in which a user is allowed to grasp a position of his or her grade in the whole group. In this case, it may be configured so that 50 users are divided into five grades including a "royal family", a "high-class noble", a "noble", a "knight", and a "citizen" as one category from the top every ten users, for example.

The dividing section 14 has a function to divide groups into a plurality of elements respectively corresponding to the grades.

Here, the word "divide into the plurality of elements" means that the plurality of users for which a grade satisfying a predetermined condition is set up can be treated as one bundle. As an example of the condition for dividing into the plurality of elements (or a plurality of units), there is a condition in which the users are users for whom the same grade is set up.

The composing section 15 has a function to compose a new group using the plurality of elements.

Here, the word "new group" means a group that is newly managed by the managing section 11. Namely, in an initial stage of composition of a new group, a rank or grade is not associated with each of the users, or a rank or grade is associated with each of the users in accordance with a result before composition of the new group.

Each of the plurality of user terminals 20, 201 to 20N is managed by a user (or player) who plays the video game, and is configured by a communication terminal, such as a cellular phone terminal, a PDA (Personal Digital Assistants), and a mobile game device, by which the user can play a network delivery type game, for example. In this regard, the configuration of the user terminal that the video game processing system 100 can include is not limited to the examples described above. However, the user terminal may be configured so that the user can recognize the video game. As the other example of the configuration of the user terminal, there is a so-called wearable divide such as a smart watch, a combination of the wearable device and a communication terminal, and the like.

Further, each of the plurality of user terminals 20, 201 to 20N is connected to the communication network 30, and includes hardware (for example, a display device for displaying a game screen, an audio output device and the like) and software for carrying out the video game by communicating with the video game processing server 10. In this regard, each of the plurality of user terminals 20, 201 to 20N may be configured so as to directly communicate with each other without the video game processing server 10. Further, the configuration of each of the plurality of user terminals 20, 201 to 20N for receiving a user operation is not particularly limited. However, it is preferable that each of the plurality of user terminals 20, 201 to 20N has high operability. As an example of the configuration for receiving a user operation, there is a configuration in which an operation by the user is received via a touch panel or a physical key.

Next, an operation of the video game processing system 100 according to the present embodiment (hereinafter, referred to as the "system 100") will be described.

Figure 3:
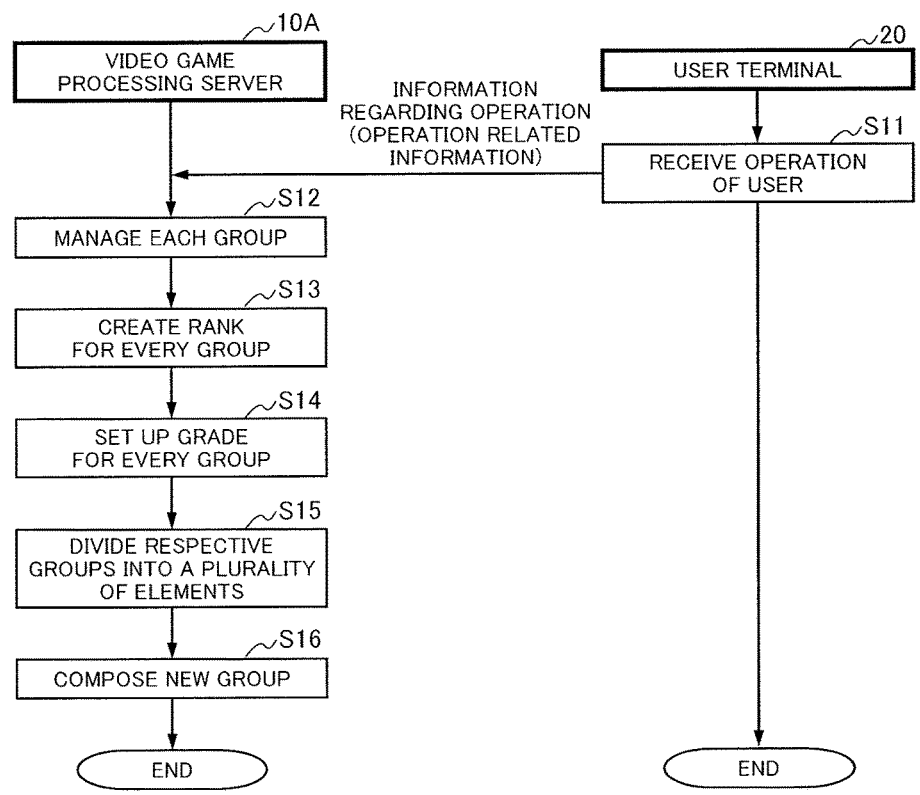
FIG. 3 is a flowchart showing an example of game processing corresponding to at least one of the embodiments according to the present invention.

FIG. 3 is a flowchart showing an example of game processing carried out by the system 100. In the game processing according to the present embodiment, processing directly or indirectly related to processes to manage each group in response to an operation of the user and to compose a new group is carried out. Hereinafter, a case where the server 10A and the user terminal 20 (hereinafter, referred to as the "terminal 20") carries out the game processing will be described as an example.

The game processing is started in a case where the terminal 20 becomes a state where a user operation can be received in accordance with progress of the video game, for example.

In the game processing, the terminal 20 first receives a user operation (Step S11). In the present embodiment, the terminal 20 generates information regarding the received user operation (operation related information), and transmits the generated operation related information to the server 10A.

The server 10A receives the operation related information from the terminal 20, and manages each of groups (Step S12). In the present embodiment, the server 10A updates information regarding the user who operates the terminal 20 (user information) on the basis of the received operation related information.

When each of the groups is managed (that is, when processing regarding the management is carried out), the server 10A creates a rank for every group (Step S13). In the present embodiment, the server 10A refers to user information of each of the users who belong to the group, and creates ranks. In this regard, the created ranks are registered in a predetermined storage region as the user information.

When the rank is created, the server 10A sets up a grade for every group on the basis of the created rank (Step S14). In the present embodiment, the server 10A sets up grades of the users to ranks. In this regard, the grade is set up as a part of the user information.

When the grade is set up, the server 10A divides the respective groups into the plurality of elements (Step S15). In the present embodiment, the server 10A defines each of the elements on the basis of the grade.

When the respective groups are divided into the plurality of elements, the server 10A composes a new group using the plurality of elements (Step S16). In the present embodiment, the server 10A creates groups of the same number before the division, and terminates the processing herein.

Figure 4:
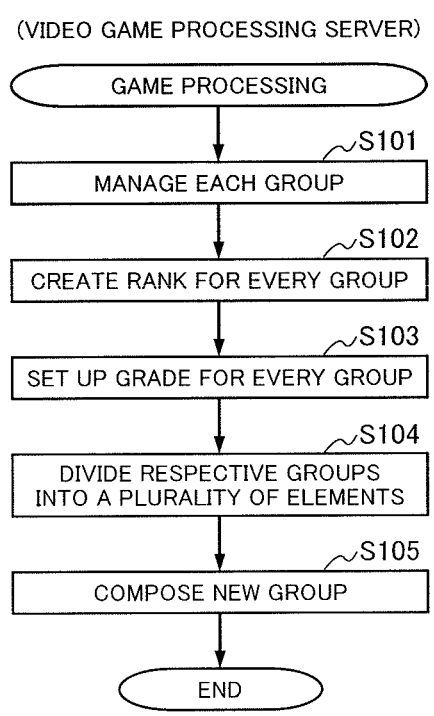
FIG. 4 is a flowchart showing an example of an operation of a server side in game processing corresponding to at least one of embodiments according to the present invention.

FIG. 4 is a flowchart showing an example of an operation of the server 10A side in the game processing. Here, an operation of the server 10A according to the video game processing system 100 will be described again in detail.

In the game processing, the server 10A carries out processing regarding management of each group (Step S101), and creates a rank for every group (Step S102).

When the grade is set up for every group (Step S103), the server 10A divides the respective groups into the plurality of elements on the basis of the created rank (Step S104); composes a new group using the plurality of elements thus divided (Step S105); and terminates the processing herein.

Figure 5:
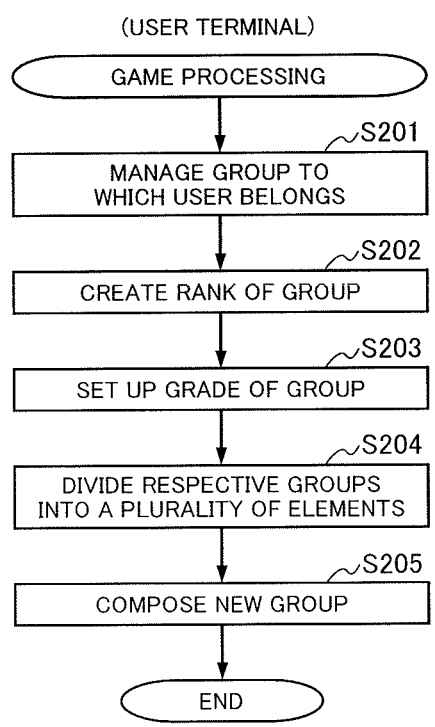
FIG. 5 is a flowchart showing an example of an operation of a terminal side in the game processing corresponding to at least one of the embodiments according to the present invention.

FIG. 5 is a flowchart showing an example of an operation of the terminal 20 side in a case where the terminal 20 carries out the game processing. Hereinafter, a case where the terminal 20 includes a storage section for storing information regarding a group to which a user who operates himself or herself belongs and manages the group by communicating with other terminals will be described as an example. In this case, the terminal 20 includes the similar configuration to that of the server 10A (not shown in the drawings).

In the game processing, the terminal 20 first manages a group to which the user who operates the terminal 20 belongs (Step S201). In the present embodiment, the terminal 20 receives information regarding other user who belongs to the group from other terminal operated by the other user and updates the information.

When the processing regarding management of the groups is carried out, the terminal 20 creates a rank for every group (Step S202), and sets up a grade to each group on the basis of the created rank (Step S203).

When the grade is set up, the terminal 20 divides the groups into the plurality of elements (Step S204), and composes a new group using the plurality of elements (Step S205). In the present embodiment, the terminal 20 communicates with other terminal that carries out the similar processing to compose a new group; transmits other elements than the element in which the user who operates the terminal 20 is included; receives an element to which the same grade as the grade set up to the transmitted element is set up; and composes the new group. In this regard, the configuration of the terminal 20 for composing the new group is not limited to this. The configuration may be a configuration in which the terminal 20 can manage the new group to which the user who operates the terminal 20 belongs. As an example of the terminal 20 that composes a new group, there is a configuration in which the terminal 20 also manages a group to which the user who operates the terminal 20 does not belong.

As explained above, as one side of the first embodiment, the video game processing server 10A is configured so as to include the managing section 11, the creating section 12, the setting section 13, the dividing section 14, and the composing section 15. Therefore, the video game processing server 10A is allowed to: manage the plurality of users in a state where the plurality of users is grouped into groups by every predetermined number; respectively create ranks for the users in each of the groups; set up grades for the users in each of the groups on the basis of the ranks of the users; divide the groups into a plurality of elements, the plurality of elements respectively corresponding to the grades; and compose a new group using the plurality of elements. This makes it possible to allow to create ranking capable of causing the user to attract his or her interest in game results of the other users.

As a result, when the groups are to be reconfigured (or reorganized), the other user who has a grade close to that of the user belongs to the same group as the user, and ranking (or rank) is newly created for the group. This makes it possible to cause the user to attract his or her interest in the ranking, and it is thereby possible to provide an amusement or pleasure for a relationship based on friendly rivalry with the other users to the plurality of users.

Second Embodiment

Figure 6:
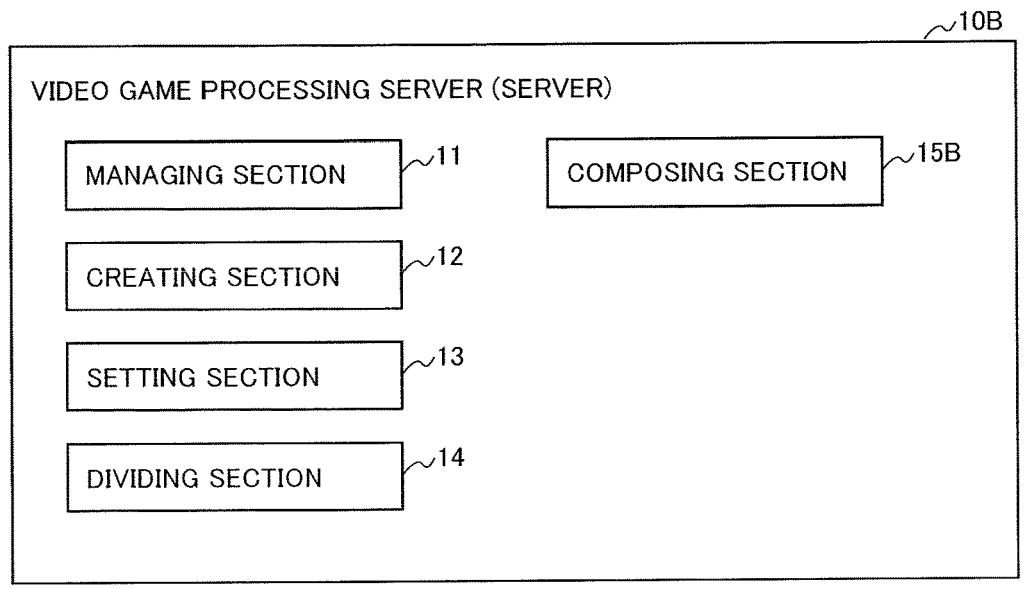
FIG. 6 is a block diagram showing a configuration of the video game processing server corresponding to at least one of the embodiments according to the present invention.

FIG. 6 is a block diagram showing a configuration of a video game processing server 10B (a server 10B) that is an example of the video game processing server 10. In the present embodiment, the server 10B at least includes a managing section 11, a creating section 12, a setting section 13, a dividing section 14, and a composing section 15B.

The composing section 15B has a function to compose a new group so as to become a result in which at least a part of the plurality of elements is rearranged among the plurality of groups.

Here, the method of realizing the rearranged result is not particularly limited. However, it is preferable that the method is a method by which a processing load does not become excessive even though the number of users becomes larger. As an example of the method of realizing the rearranged result, there is a method of: setting up an identification number according to the grade to each of the elements; and combining the elements so that a combination of identification numbers contained in the group when to set up the grade does not become identical to a combination of identification numbers contained in the new group. Further, as another example of the method of realizing the rearranged result, there is a method of: determining an element that represents each of the groups; and composing a new group by in turn assigning other elements with respect to the determined element. In this case, the method may be configured so as not to change the group to which the element corresponding to the most highly grade in each of the groups belongs, and to change the group to which the elements corresponding to the lower grades belong, for example.

Figure 7:
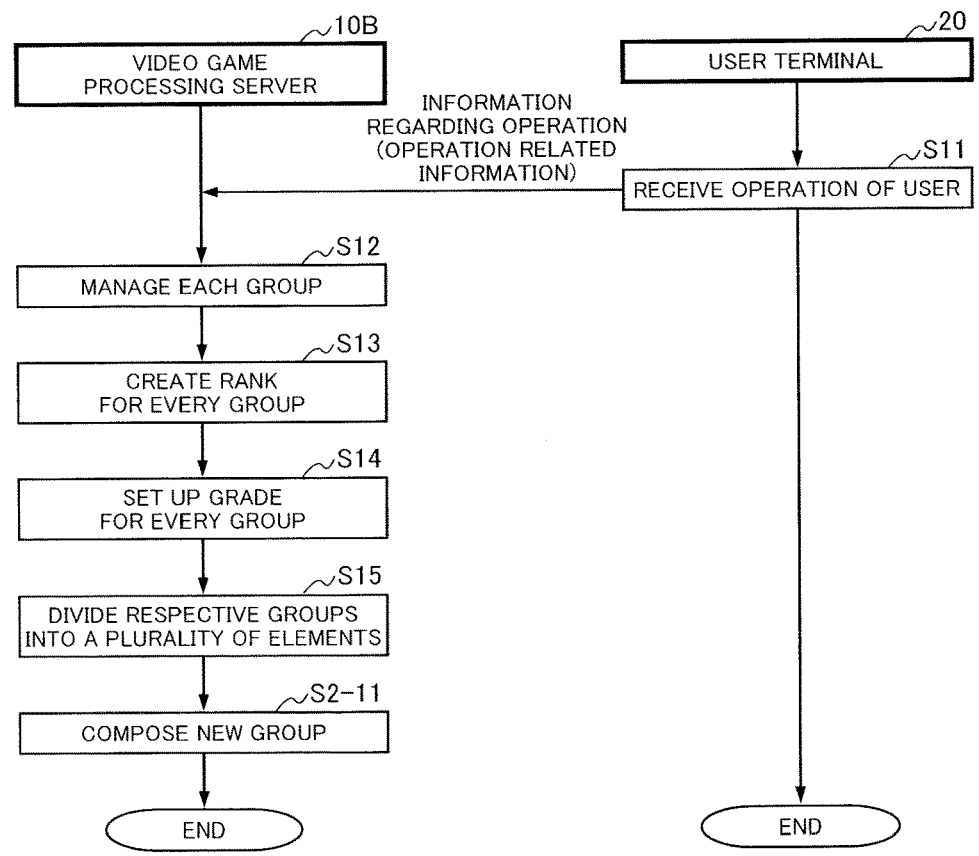
FIG. 7 is a flowchart showing an example of the game processing corresponding to at least one of the embodiments according to the present invention.

FIG. 7 is a flowchart showing an example of the game processing carried out by the system 100. Hereinafter, operations of the server 10B and the terminal 20 will be described as an example. In this regard, a flowchart showing an operation of each of the server 10B and the terminal 20 is omitted from a point of view to avoid repeated explanation.

When the plurality of elements is divided into the respective groups (Step S15), the server 10B composes a new group so as to become a result in which at least a part of the plurality of elements is rearranged among the plurality of groups (Step S2-11), and terminates the processing herein. In the present embodiment, the server 10B composes some new groups by combining the elements to which the plurality of groups is divided in accordance with a predetermined rule.

As explained above, as one side of the second embodiment, the video game processing server 10B is configured so as to include the managing section 11, the creating section 12, the setting section 13, the dividing section 14, and the composing section 15B. Therefore, it is possible to compose a new group so as to become a result in which at least a part of the plurality of elements is rearranged among the plurality of groups. This makes it possible to realize group reorganization by which the user can find "the other users who get to know the user in some way".

Namely, the plurality of users who may have a well-matched play style belongs to the same group before and after the group reorganization. Therefore, it is possible to provide a chance, in which the users are evenly matched and a sense of solidarity and a sense of rivalry arise in them, to the users.

Third Embodiment

Figure 8:
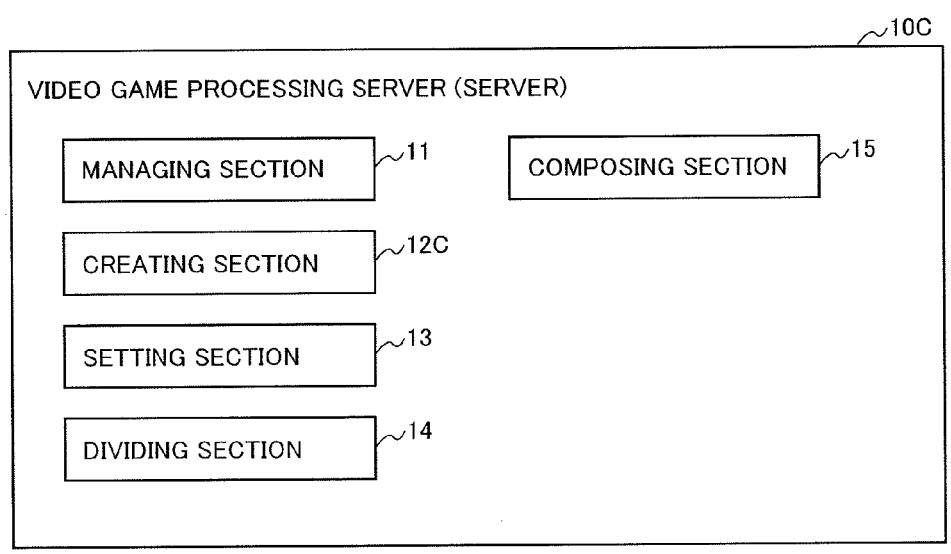
FIG. 8 is a block diagram showing a configuration of the video game processing server corresponding to at least one of the embodiments according to the present invention.

FIG. 8 is a block diagram showing a configuration of a video game processing server 10C (a server 10C) that is an example of the video game processing server 10. In the present embodiment, the server 10C at least includes a managing section 11, a creating section 12C, a setting section 13, a dividing section 14, and a composing section 15.

The creating section 12C has a function to create a rank on the basis of game elements acquired within a predetermined period of time by each of users and a function to exclude users who have acquired no game element within the predetermined period of time from a creation target for the ranks.

Here, the "game element" means what a user is allowed to acquire (or obtain) by playing the video game. As examples of the game element, various kinds of objects such as a coin or point, an item in the video game, and the like are thought.

Further, the term "excluded from the creation target for the ranks" means that the rank is not included in the group. Further, the term "predetermined period of time" may be a period of time defined in advance before creation of rank, and a length thereof is not particularly limited. Further, a period of time when a game element can be acquired may not coincide with a period of time by which it is determined that a user is to be excluded from the creation target for the ranks. Namely, for example, in a case where a rank is created so that the more coins the user acquired within the event period of 30 days, the higher rank the user becomes, the user who acquired coins in the first half of the event but does not log in continuously for 10 days in the second half of the event is excluded from the creation target for the ranks. In this case, it may be configured so that even the user excluded from the creation target for the ranks logs in the event within the event period, whereby an exclusion state is released.

Figure 9:
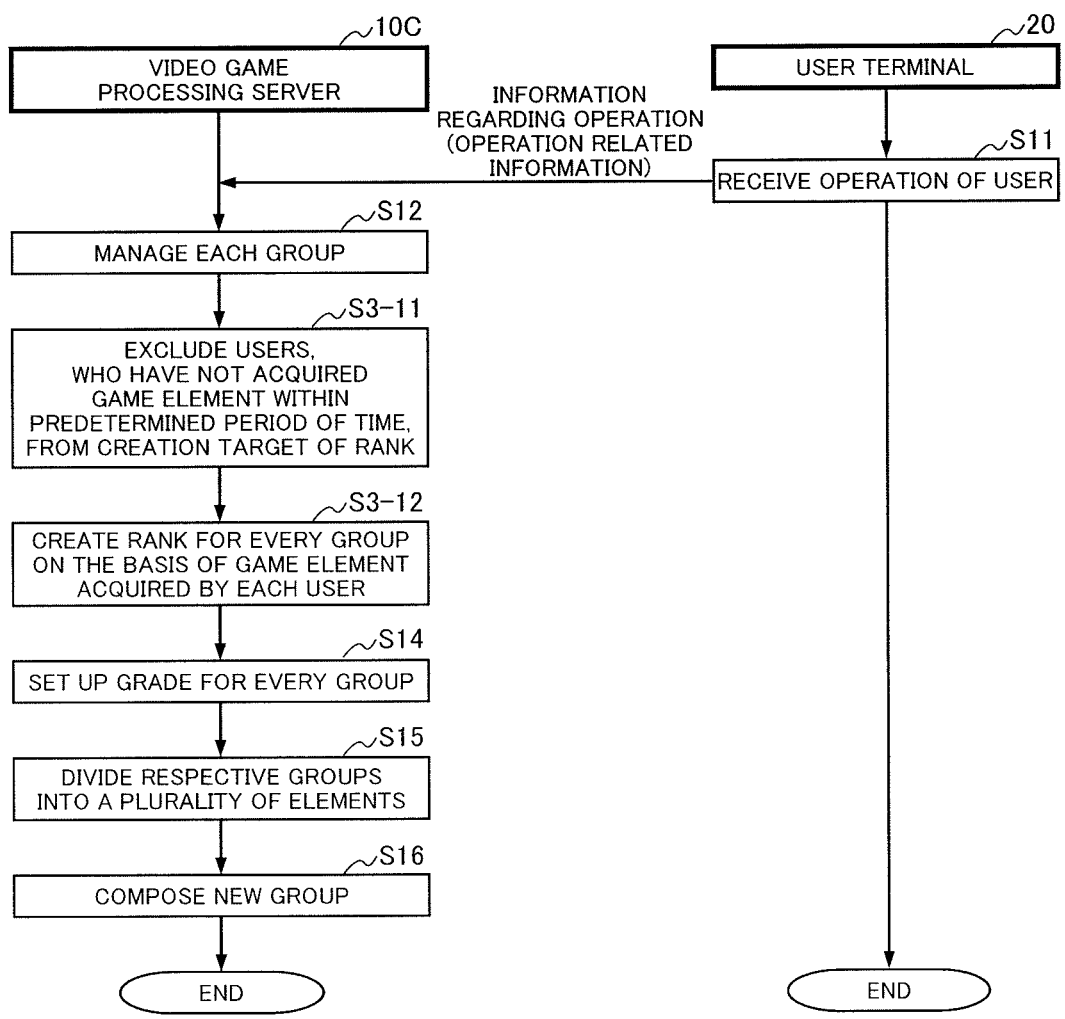
FIG. 9 is a flowchart showing an example of the game processing corresponding to at least one of the embodiments according to the present invention.

FIG. 9 is a flowchart showing an example of the game processing carried out by the system 100. Hereinafter, operations of the server 100 and the terminal 20 will be described as an example. In this regard, a flowchart showing an operation of each of the server 100 and the terminal 20 is omitted from a point of view to avoid repeated explanation.

When the processing regarding management of each group is carried out (Step S12), the server 100 excludes users who have acquired no game element within the predetermined period of time from the creation target for the ranks (Step S3-11). In the present embodiment, the server 100 specifies users to be excluded from the creation target for the ranks (excluded users), and updates user information of each of the specified excluded users, whereby the excluded users are excluded from the creation target for the ranks.

When the excluded user are excluded, the server 100 creates a rank for every group on the basis of the game elements acquired by each user (Step S3-12). In the present embodiment, the server 10C refers to user information of each of the users other than the excluded user in the users who belong to the group, and creates a rank.

As explained above, as one side of the third embodiment, the video game processing server 100 is configured so as to include: the managing section 11, the creating section 12C, the setting section 13, the dividing section 14, and the composing section 15. Therefore, it is possible to create a rank on the basis of the game elements acquired within the predetermined period of time by each user, and exclude users who have acquired no game element within the predetermined period of time from the creation target for the ranks. This makes it possible to reduce the processing load of the server without exerting a bad influence on the users who participate in the video game.

Namely, by excluding a user, who has not participated in the video game, from the ranking, and advancing ranks of the users who participate in the video game, it is possible to motivate the users to continuously participate in the video game.

In this regard, the server 10C may be configured so that, when the user is excluded from the creation target for the ranks, the user is excluded from the group and other user is cased to belong to the group. This makes it possible to add the user who logs in during the event to a group with a vacancy at any time, for example, and to prevent active users who belong to the group from being reduced.

Fourth Embodiment

Figure 10:
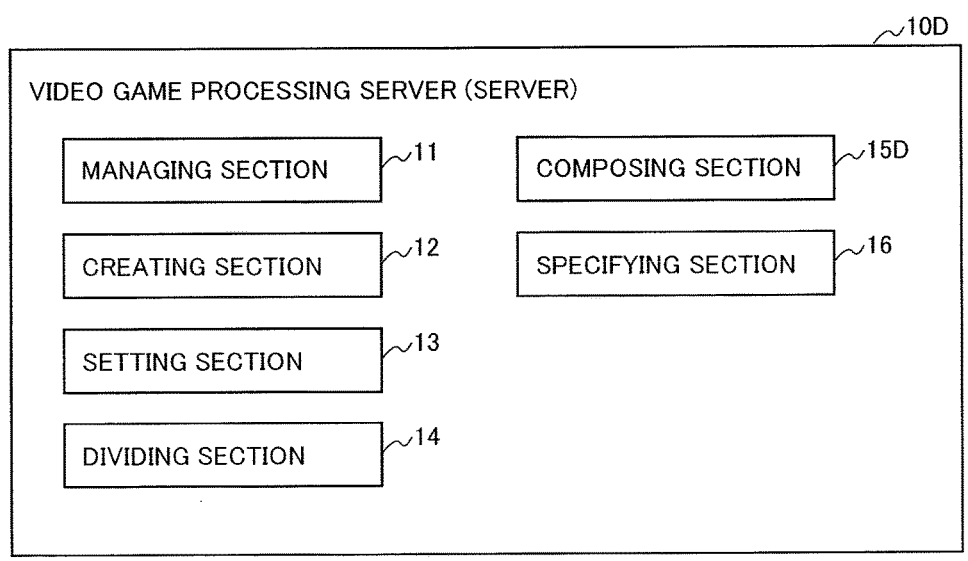
FIG. 10 is a block diagram showing a configuration of the video game processing server corresponding to at least one of the embodiments according to the present invention.

FIG. 10 is a block diagram showing a configuration of a video game processing server 10D (a server 10D) that is an example of the video game processing server 10. In the present embodiment, the server 10D at least includes a managing section 11, a creating section 12C, a setting section 13, a dividing section 14, a composing section 15D, and a specifying section 16.

The specifying section 16 has a function to specify a user who is not grouped (a special user).

Here, the configuration for specifying the special user is not limited particularly. As examples of the configuration for specifying the special user, there are a configuration in which a storage section for storing the information regarding the special user and a configuration in which it is registered that the user is the special user to the user information. Further, as examples of the special user, there are a user (a new user) who has been just registered in the video game and an excluded user. In this regard, when the new user is assigned to any group, or when the new user plays the video game after being assigned to the group, such a user is not treated as the new user.

The composing section 15D has a function to assign the special user to the composed new group in a case where the number of special users is less than a predetermined number.

Here, the word "assign a special user to a new group" means that the special user is caused to belong to a new group. The configuration for assigning the special user to the new group is not limited particularly. However, it is preferable that variation in the number of users to compose a plurality of new groups does not become excessive. As an example of the configuration for assigning the special user to the new group, there is a configuration in which identification information of the new user is registered by giving priority to a new group in which the number of users is smaller.

Figure 11:
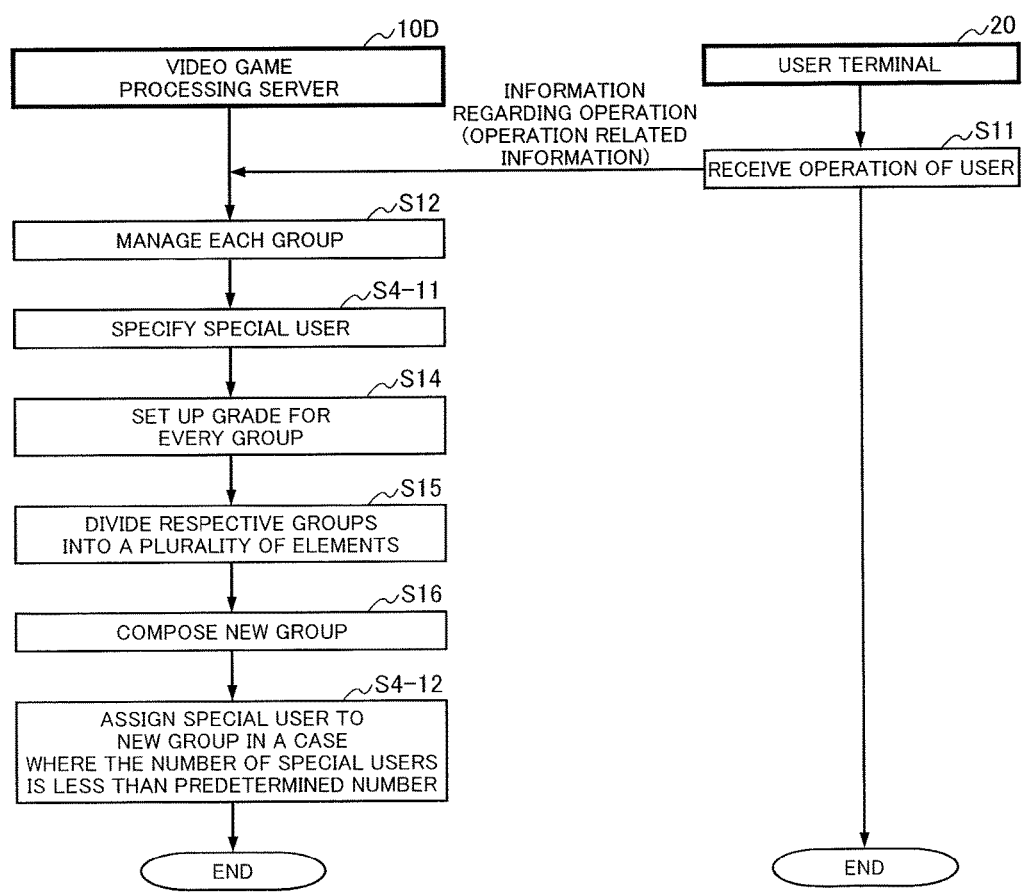
FIG. 11 is a flowchart showing an example of the game processing corresponding to at least one of the embodiments according to the present invention.

FIG. 11 is a flowchart showing an example of the game processing carried out by the system 100. Hereinafter, operations of the server 10D and the terminal 20 will be described as an example. In this regard, a flowchart showing an operation of each of the server 10D and the terminal 20 is omitted from a point of view to avoid repeated explanation.

When the processing regarding the management of each of the groups is carried out (Step S12), the server 10D specifies the special user (Step S4-11). In the present embodiment, the server 10D specifies the new user as the special user.

When the new user is specified, the server 10D carries out setup of a grade, division of groups, and composition of a new group (Steps S14, S15, and S16). In a case where the number of special users is less than a predetermined number, the server 10D assigns the special user to the new group (Step S4-12). Then, the server 10D terminates the processing herein. In the present embodiment, the server 10D determines whether the number of special users is less than the predetermined number or not by referring to the user information. In a case where it is determined that the number of special users is less than the predetermined number, the server 10D updates the information regarding the group so that the special user is included in the new group.

As explained above, as one side of the fourth embodiment, the video game processing server 10D is configured so as to include the managing section 11, the creating section 12C, the setting section 13, the dividing section 14, the composing section 15D, and the specifying section 16. Therefore, it is possible to specify a user (the special user) who has not been grouped. Then, in a case where the number of special users is less than the predetermined number, it is possible to assign the special users to the composed new group. This makes it possible to reduce the processing load required for grouping the special users.

Namely, it is possible to reduce the processing load required for grouping compared with a case of adjusting how all of the users belong to the groups in order to group the special users.

In this regard, it has not been mentioned particularly in the example of the fourth embodiment described above. However, the server 10D may be configured so as to assign the special users who are generated every elapse of the predetermined period of time to any group unless the predetermined number or more of special users is generated within the predetermined period of time. Namely, the video game processing apparatus may be configured so that the users can in turn participate in the video game from the middle within a range that the number of users who belong to the group becomes excessive.

Further, it has not been mentioned particularly in the example of the fourth embodiment described above. However, in a case where the number of special users is not less than the predetermined number, the processing carried out by the server 10D is not limited particularly. Namely, in the example of the fourth embodiment, the video game processing apparatus is configured so that the special users are assigned to a new group in a case where the number of special users is less than the predetermined number. This makes it possible to prevent the number of groups from exceeding the number intended by the administrator (for example, the number by which it is thought that each of the users expects the upper of the group). In this regard, as an example of the processing carried out by the server 10D in a case where the number of special users is not less than the predetermined number, there is processing to compose a new group from a part of the special users, and assign the other special users to a new group. Further, in this case, the server 10D may be configured so as to manage the part of the special users as the special user until a next new group is composed.

Fifth Embodiment

Figure 12:
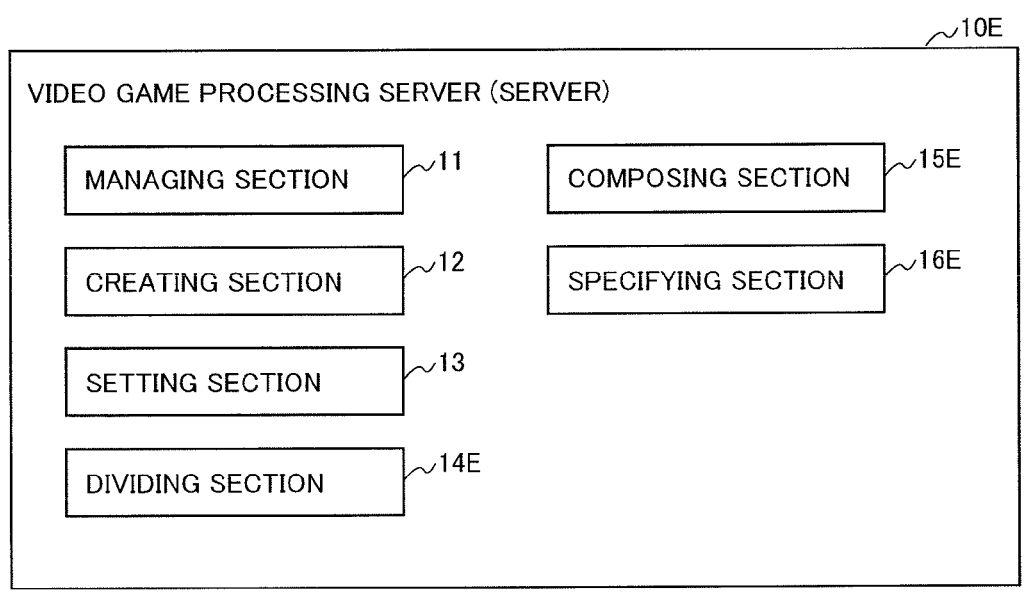
FIG. 12 is a block diagram showing a configuration of the video game processing server corresponding to at least one of the embodiments according to the present invention.

FIG. 12 is a block diagram showing a configuration of a video game processing server 10E (a server 10E) that is an example of the video game processing server 10. In the present embodiment, the server 10E at least includes a managing section 11, a creating section 12, a setting section 13, a dividing section 14E, a composing section 15E, and a specifying section 16E.

The dividing section 14E has a function to carry out division in a case where a condition to compose a new group is satisfied.

The composing section 15E has a function to compose a new group so as to become a result in which a plurality of elements corresponding to the same grade or a plurality of grades that satisfies a predetermined condition is collected.

Here, the method of realizing the collected result is not limited particularly. It is preferable that the method is a method in which a processing load does not become excessive even though the number of users becomes larger. As an example of the method of realizing the collected result, there is a method of extracting users for which the same grade is set up from a predetermined number of groups.

The specifying section 16E has a function to specify the special user. Further, the composing section 15E has a function to compose a new group from only special users in a case where the number of special users is a predetermined number or more.

Figure 13:
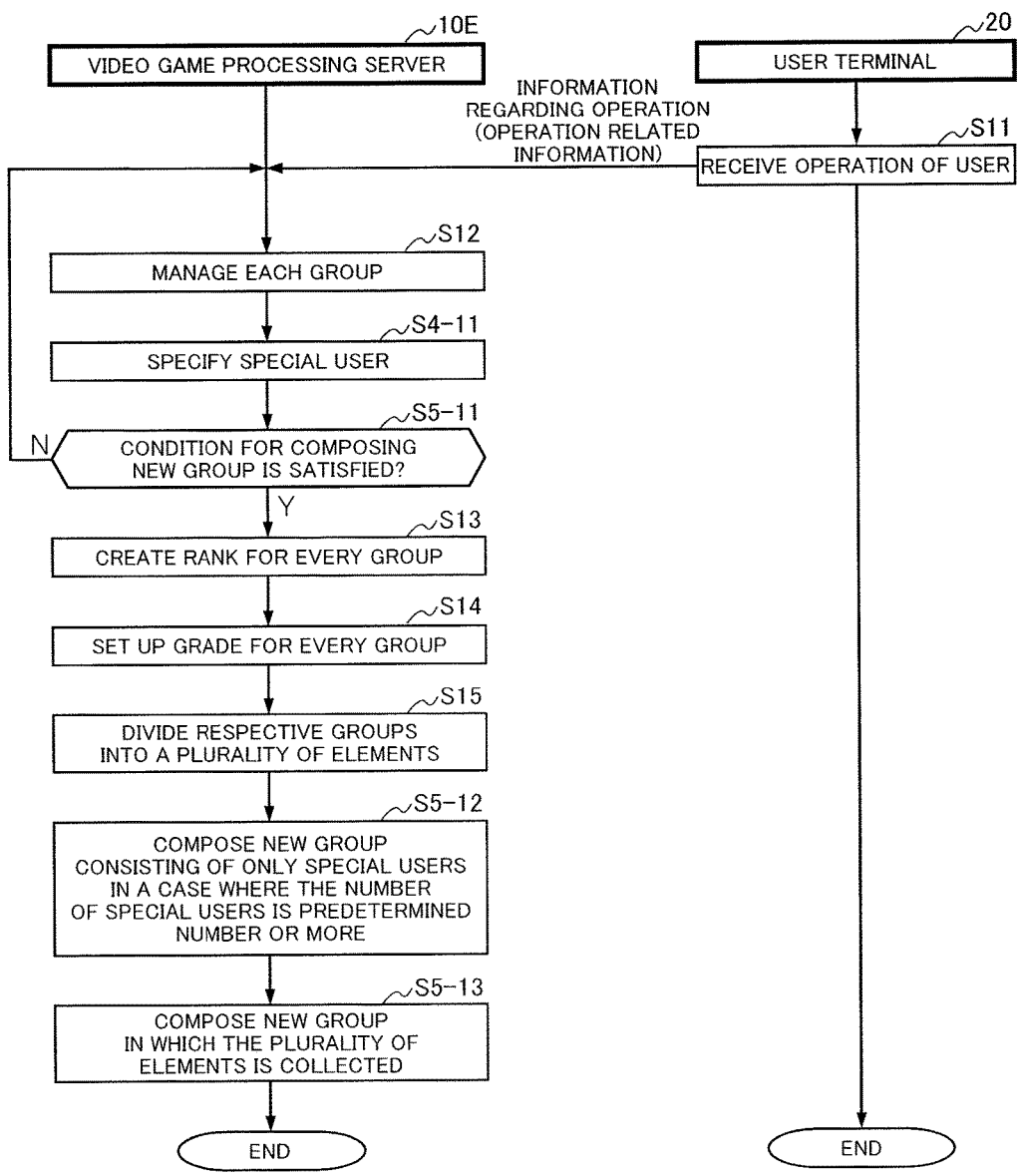
FIG. 13 is a flowchart showing an example of the game processing corresponding to at least one of the embodiments according to the present invention.

FIG. 13 is a flowchart showing an example of the game processing carried out by the system 100. Hereinafter, operations of the server 10E and the terminal 20 will be described as an example. In this regard, a flowchart showing an operation of each of the server 10E and the terminal 20 is omitted from a point of view to avoid repeated explanation.

When the special user is specified (Step S4-11), the server 105 determines whether a condition to compose a new group is satisfied or not (Step S5-11). In the present embodiment, the server 105 refers to information regarding the video game, and determines whether the condition is satisfied or not. In this regard, the information to which the server 10E refers at this time is not limited particularly. As an example of the referred information, there is information regarding a period when an event within the video game is held.

In a case where it is determined that the condition for composing a new group is not satisfied ("No" at Step S5-11), the server 10E continues to carry out the processing regarding the management of the groups. On the other hand, in a case where it is determined that the condition to compose the new group is satisfied ("Yes" at Step S5-11), the server 10E creates a rank for every group (Step S13).

When the grade is set up for every group (Step S14) and the groups are divided into the plurality of elements (Step S15), the server 10E determines whether the number of special users is a predetermined number or more. In a case where it is determined that the number of special users is the predetermined number or more, the server 10E composes a new group from only the special users (Step S5-13). In the present embodiment, the server 10E refers to the user information to determine whether the number of special users is the predetermined number or more. In a case where it is determined that the number of special users is the predetermined number or more, the server 10E composes the new group from only the special users.

Further, the server 10E composes a new group in which the plurality of elements is collected (Step S5-13). In the present embodiment, the server 10E updates the user information so that users to which the same grade is set up are associated with the same new group.

As explained above, as one side of the fifth embodiment, the video game processing server 10E is configured so as to include the composing section 15E. Therefore, it is possible to compose a new group so as to become a result in which the plurality of elements corresponding to the same grade or a plurality of grades that satisfy a predetermined condition is collected. This makes it possible to give variety to reconfiguration (or reorganization) of groups.

Further, the server 10E is configured so as to include the composing section 15E and the specifying section 16E. Therefore, it is possible to specify the special users. In a case where the number of special users is the predetermined number or more, it is possible to compose a new group from only the special users. This makes it possible to reduce a processing load required for grouping the special users. Namely, it is possible to reduce the processing load required for grouping on the server compared with a case of adjusting how all of the users belong to the groups in order to group the special users.

Further, the server 10E is configured so as to include the dividing section 14E. Therefore, it is possible to carry out division in a case where the condition to compose a new group is satisfied, and to carry out processing regarding the configuration of the new group at arbitrary timing of the administrator who provides the video game.

Sixth Embodiment

Figures 14, 15:
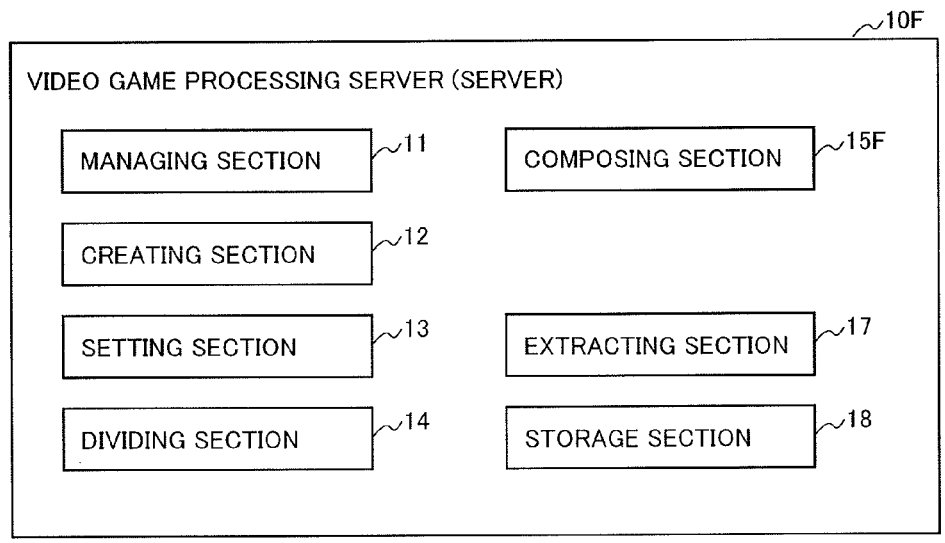
FIG. 14 is a block diagram showing a configuration of the video game processing server corresponding to at least one of the embodiments according to the present invention.
FIG. 15 is an explanatory drawing for explaining an example of a storage state of information corresponding to at least one of the embodiments according to the present invention.

FIG. 14 is a block diagram showing a configuration of a video game processing server 10F (a server 10F) that is an example of the video game processing server 10. In the present embodiment, the server 10F at least includes a managing section 11, a creating section 12, a setting section 13, a dividing section 14, a composing section 15F, an extracting section 17, and a storage section 18.

The extracting section 17 has a function to extract one or more users (an associated user group) who have an intention to continuously belong to the same group from at least a part of the users.

Here, the word "at least a part of users" means that the user to be in an extracting range is not limited particularly so long as the user can be specified by the user information to which the server 10F can refer. As examples of the at least a part of the users, there are all users who are registered in the video game related to the server, a group of users who satisfy a predetermined condition, and the like. As an example of the predetermined condition, there is a condition that can be satisfied in accordance with progress of the video game (a condition regarding a level, a condition regarding usage items, and the like).

Here, the configuration for extracting the associated user group is not limited particularly. However, it is preferable that at least a part of the users contained in the associated user group is allowed to recognize other users. As examples of the associated user group, there are a plurality of users who selected any of the plurality of users each other (for example, a plurality of users in which a so-called friend relationship is established), and a plurality of users in which one user selected the other user in the plurality of users (for example, a helper or supporter, and an opponent).

The composing section 15F has a function to compose a new group using the plurality of elements divided by the dividing section 14 and the associated user group extracted by the extracting section 17.

Here, the configuration for composing the new group by using the plurality of elements and the associated user group is not limited particularly. However, it may be configured so that a group before the division can have the same configuration as that of a new group. Further, a new group may be composed by only the associated user group, or may include the plurality of elements and the associated user group.

The storage section 18 has a function to store information regarding a group (group information).

FIG. 15 is an explanatory drawing for explaining an example of a storage state of the information stored in the storage section 18. As shown in FIG. 15, the storage section 18 stores a rank and a grade so as to be associated with identification information of a user who belongs to each of the groups. In this regard, the information stored in the storage section 18 is not limited to this. However, it is preferable that it can be configured so as be able to realize that at least a part of the users belongs to the same group at the time of creation of ranks in each of the groups, reorganization of the groups by using the ranks, and before and after the reorganization.

Figure 16:
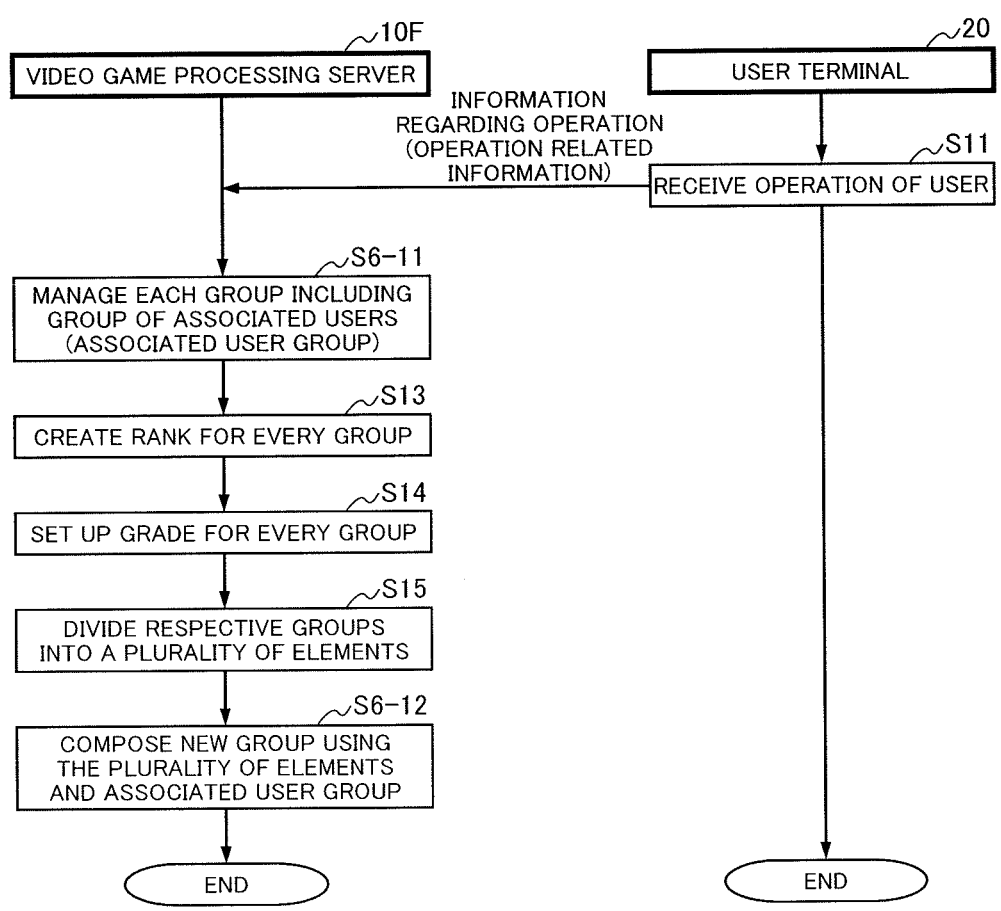
FIG. 16 is a flowchart showing an example of the game processing corresponding to at least one of the embodiments according to the present invention.

FIG. 16 is a flowchart showing an example of the game processing carried out by the system 100. Hereinafter, operations of the server 10F and the terminal 20 will be described as an example. In this regard, a flowchart showing an operation of each of the server 10F and the terminal 20 is omitted from a point of view to avoid repeated explanation.

In the game processing according to the present embodiment, the server 10F carries out processing for managing each of the groups including a group of associated users (the associated user group) on the basis of the operation related information received from the terminal 20 and the like (Step S6-11). As an example of the processing herein according to the present embodiment, there is processing to associate a user who operates the terminal 20 with other users by using the operation related information and user information.

When the processing regarding the group management is carried out and the creation of ranks (Step S13), the setup of grade (Step S14), and division of the setup groups (Step S14) are carried out, the server 10F composes a new group by using the plurality of elements and the associated user group (Step S6-12). In the present embodiment, the server 10F composes a plurality of new groups by giving priority to assignment of the associated user group. Namely, in a case where the number of users who are to be managed as the associated user group is a predetermined number or more, the server 10F first composes a new group in which the number of users is the predetermined number only from the associated user group. In a case where a group with the predetermined number of users cannot be composed singly from the associated user group, the server 10F cancels limitation by the associated user group to compose a new group, or assigns other user to the associated user group.

As explained above, as one side of the sixth embodiment, the video game processing server 10F is configured so as to include the managing section 11, the creating section 12, the setting section 13, the dividing section 14, the composing section 15F and the extracting section 17. Therefore, it is possible to extract a plurality of users (the associated user group) who has an intention to continuously belong to the same group from among the at least apart of the users, and to compose a new group by using the plurality of elements and the associated user group. This makes it possible to determine a member who continuously belongs to the same group on the basis of the intention of the user.

Namely, for example, like a so-called "friend", it is possible to create a ranking within a community in which the plurality of users recognizes each other.

Seventh Embodiment

Figure 17:
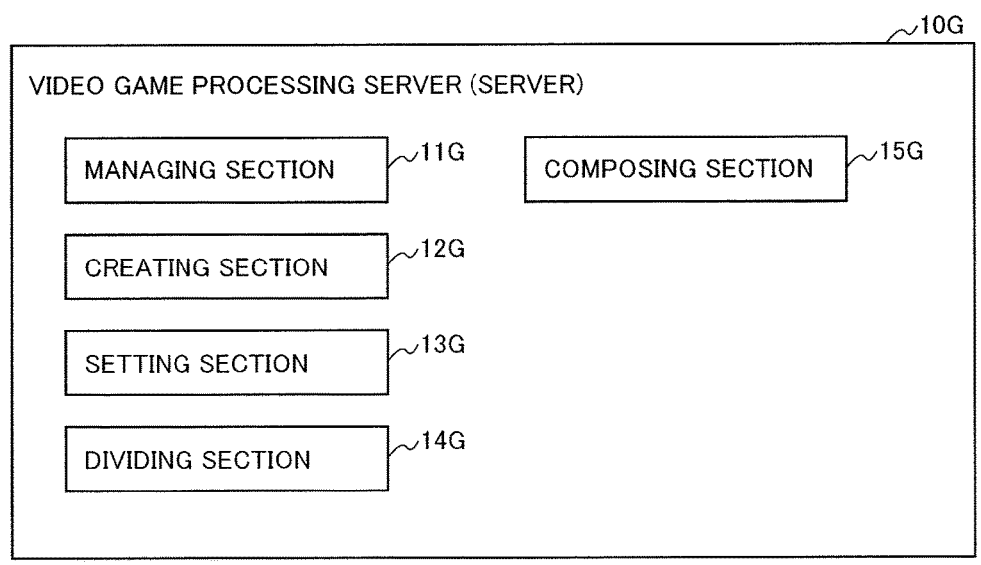
FIG. 17 is a block diagram showing the video game processing server corresponding to at least one of the embodiments according to the present invention.

FIG. 17 is a block diagram showing a configuration of a video game processing server 10G (a server 10G) that is an example of the video game processing server 10 in the video game processing system 100 (see FIG. 1). In the present embodiment, the server 10G at least includes a managing section 11G, a creating section 12G, a setting section 13G, a dividing section 14G, and a composing section 15G in order to realize the video game in which the users who have close ranking can be improved through friendly rivalry.

The managing section 11G has a function to manage information regarding users who participate in a network game. The information regarding the users (user information) contains a group to which each of the users belongs, and a play history of the user. In the present embodiment, the managing section 11G manages one group of members as up to 50 users.

The creating section 12G has a function to create a ranking of the users on the basis of the user information and a creation rule of the ranking. In the present embodiment, the creating section 12G groups the users so that the users competes ranking in the group. Further, the content of the ranking is changed every week. As an example of the content of the ranking, there are ones on which a play result influence during an event. As examples of the play result, there are various kinds of elements, such as a degree of game progress, the number of acquired items, the number of broken objects, the number of occurrence of critical, the number of suppressed monsters, the number of play, luck, a game level, skill, and the like. In this regard, it is preferable that the content of ranking does not contain a case where a specific user cannot participate in the video game.

The setting section 13G has a function to divide leagues by a predetermined unit of ranking of each of the groups. In the present embodiment, the setting section 13G divides up to five leagues by ten user unit of ranking of each of the groups.

The dividing section 14G has a function to number the users in each of the groups from the top (league number). In the present embodiment, the dividing section 14G sets up information, by which a belonging group and a belonging league can be identified, to each of the users.

The composing section 15G has a function to compose a group obtained by grouping the divided leagues as a next group. Here, the word "grouping" means that the plurality of users is grouped. In the present embodiment, the composing section 15G properly uses a plurality of groupings that contain initial grouping, normal grouping and special grouping. Hereinafter, each of the groupings according to the present embodiment will be described.

The initial grouping means grouping in which no league is used. In the initial grouping according to the present embodiment, users who log in before a predetermined period of time from ranking start (for example, before two weeks set up by the administrator) are registered as ranking participating users. Then, the users registered before the ranking start are assigned to groups in the order of descending level. At this time, grouping 40 users into one group is carried out.

The word "normal grouping" means grouping, in which leagues with the same rank are shuffled among the plurality of groups, of groupings using leagues. In the normal grouping according to the present embodiment, the divided leagues are shuffled horizontally. Here, the word "horizontally shuffle" means that leagues, to which a number indicating the same order is attached, in the plurality of groups are switched. Namely, for example, in a case where grouping is carried out in a state where leagues 1 to 5 are determined in a group G1, as a result, the group G1 may be constructed by "a first rank league of a group G2, a second rank league of a group G11, a third rank league of a group G83, a fourth rank league of a group G19, and a fifth rank league of a group G6".

The word "special grouping" means grouping to create a group by collecting league numbers among groupings using leagues. In the special grouping according to the present embodiment, leagues with the same rank are collected into the same group. Namely, for example, as a result of the special grouping, the group G1 may be constructed by "a first rank league of the group G1, a first rank league of the group G2, a first rank league of the group G3, a first rank league of the group G4, and a first rank league of the group G5".

In this regard, the composing section 15G removes a user who does not participate in the ranking from the league at the time of composing the ranking. Further, the composing section 15G adds a user who logs in during the event into any group with vacancy at any time.

In this regard, the composing section 15G prioritizes one group to become up to 50 users. However, it is preferable that the number of users is allowed to exceed 50 in a case where more users than assumed by the administrator enter the video game, for example. Further, in this case, the video game processing apparatus may be configured so as to adjust the number of users in each of new groups to become the same or substantially the same when grouping in next week.

Figure 18:
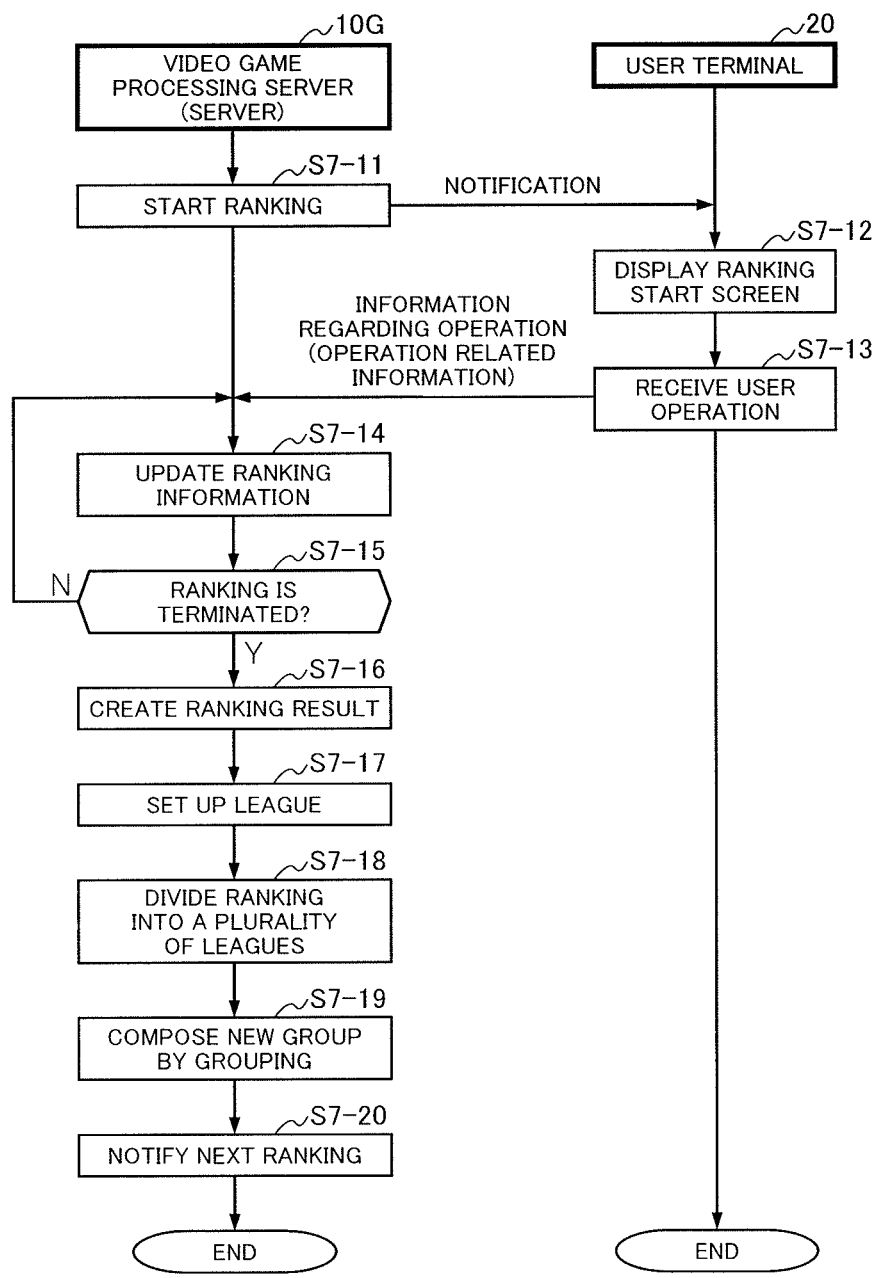
FIG. 18 is a flowchart showing an example of the game processing corresponding to at least one of the embodiments according to the present invention.

FIG. 18 is a flowchart showing an example of the game processing carried out by the system 100. Hereinafter, operations of the server 10G and the terminal 20 will be described as an example. In this regard, a flowchart showing an operation of each of the server 10G and the terminal 20 is omitted from a point of view to avoid repeated explanation.

The game processing is started when a condition for starting the ranking is satisfied, for example.

The server 10G starts ranking on the basis of the information regarding the ranking (Step S7-11). In the present embodiment, the server 10G groups the registered users by means of initial grouping, and notifies each of the users of start of the ranking.

The terminal 20 displays a game screen (ranking start screen) for notifying the user of the start of the ranking in response to notification from the server 10G (Step S7-12), and then receives a user operation (Step S7-13). In the present embodiment, the terminal 20 transmits information regarding the received operation (the operation related information) to the terminal 20.

The server 10G receives the operation related information from the terminal 20, and updates information regarding the ranking (ranking information) (Step S7-14). In the present embodiment, the server 10G updates, in accordance with the play result of the user, the ranking information of the group to which the user belongs.

When the ranking information is updated, the server 10G determines whether the ranking is to be terminated or not (Step S7-15). In the present embodiment, the server 10G carries out determination whether the ranking is terminated or not on the basis of a termination condition of ranking. Here, in a case where it is determined that the ranking is not to be terminated ("No" at Step S7-15), the server 10G continues a state where the update of the ranking information is allowed. On the other hand, in a case where it is determined that the ranking is terminated ("Yes" at Step S7-15), the server 10G creates a ranking result on the basis of the ranking information (Step S7-16). In the present embodiment, the server 10G creates information indicating a rank of each of the users in each of the groups.

When the ranking result is created, the server 10G sets up a league for each of the groups on the basis of the ranking result (Step S7-17), and divides the rankings into a plurality of leagues (Step S7-18). In this regard, the server 10G may be configured so as to realize the processing corresponding to the setup of the league and the division as one step.

Subsequently, the server 10G composes a new group by means of grouping (Step S7-19). In the present embodiment, the server 10G composes a new group by means of normal grouping for every week in principle, and composes a new group by means of special grouping once per four weeks.

When the new group is composed, the server 10A notifies each of the users of ranking in the new group (next ranking) (Step S7-20), and terminates the processing herein.

As explained above, as one side of the seventh embodiment, the video game processing server 10G is configured so as to include the managing section 11G, the creating section 12G, the setting section 13G, the dividing section 14G, and the composing section 15G. Therefore, it is possible to encourage the users who have closer ranking through friendly rivalry. Namely, it is possible to create such an atmosphere as an acquaintance naturally in order to improve through friendly rivalry. Further, it is possible to provide a feeling that "the user might probably win" to a lot of users. Namely, it is possible to create a possibility that a user with a different play style (for example, doing anything little by little) can become higher order of the ranking by changing the content or theme (or subject) of the ranking every time.

In this regard, the server 10G may be configured so as to manage a plurality of rankings, a period of implementation and the content of which are different from each other, at the same time. In this case, for example, the server 10G may be configured so as to manage total ranking that reflects past play histories, monthly ranking, and weekly ranking at the same time.

Further, the server 10G may be configured so as to give the user a reward in accordance with the content of the ranking and the result. By providing plural kinds of the content of the rankings and the results, it is possible to allow each ranking to play a different role. This makes it possible to provide, to the user, a motivation to continue to play the video game. In this case, for example, it is preferable that the server 10G is configured so as to: setup a high reward in order to set up the total ranking and the monthly ranking to heavy users and middle users mainly; and cause the content of the ranking to include many things in order to construct the weekly ranking as a main end content for light users to heavy users.

In this regard, timing when the server 10G updates the ranking information is not limited to the timing when the operation related information is received. As the other example of update timing, there is an elapse of time.

In this regard, in the example of the seventh embodiment described above, the case where the server 10G divides the users who participate in the video game into leagues has been explained as an example. However, the configuration of the server 10G is not limited to this configuration. The server 10G may be configured so as to provide the plurality of groups. As an example of the other configuration of the server 10G, there is a configuration in which the server 10G composes a new group containing each of the users and other users around X users of the user ("x" is an arbitrary integer). In this case, the video game processing apparatus may be configured so that a user overlaps the plurality of new groups. For example, the video game processing apparatus may be configured so that ranking of a user with a first rank is created with users respectively with second to ten ranks, and ranking of a user with a fifth rank is created with users respectively with third and fourth ranks and sixth to twelfth ranks. This makes it possible to provide, to the users, a motivation to aim at a higher rank in the new group.

In this regard, it has not been mentioned particularly in the example of the seventh embodiment described above. However, the server 10G may be configured so as to temporarily specify and group a lump of users without grouping the groups by a hierarchical category (or genre). Namely, the server 10G may be configured so as to collect the plurality of users, for which the same or approximately same information is set up, into one group without composing a new group by using grades, but by using information regarding at least a part of the users, such as an access history, a play history, various kinds of levels, a billing amount, the number of friends, and the like of each of the users, for example. This makes it possible for a user who frequently plays the video game in the morning to be aware of ranking of the other users who have a similar play tendency, for example. Therefore, it becomes possible to encourage the user in interest in game results of the other users.

As explained above, one or two or more shortages are solved by each of the embodiments of the present application. In this regard, the effects by each of the embodiments are non-limiting effects or one example of effects.

In this regard, it has not been mentioned particularly in each of the embodiments described above. However, the video game processing apparatus (for example, the server 10 or the terminal 20) may be configured so that one user is allowed to belong to the plurality of groups. In this case, the video game processing apparatus may be configured so that each of the users is allowed to refer to a plurality of new groups to each of which the user belongs. As examples of the plurality of new groups, there are a new group composed in accordance with the rank and a new group consisted solely of the associated user group.

In this regard, it has not been mentioned particularly in each of the embodiments described above. However, the video game processing apparatus (for example, the server 10 or the terminal 20) may be configured so as to give a privilege to the user in accordance with his or her rank or grade. In this case, for example, the video game processing apparatus may be configured so as to give another privilege to the user in the group that satisfies a predetermined condition among all of the groups in addition to the privilege for each group. As an example of the predetermined condition, there is an acquisition amount of game elements in a case where a rank is created in accordance with the acquisition amount of game elements.

In this regard, it has not been mentioned particularly in each of the embodiments described above. However, the video game processing apparatus (for example, the server 10 or the terminal 20) may be configured so as to divide the plurality of grades as one element. Namely, for example, in a case where five kinds of grades are set up to one group, the video game processing apparatus may be configured so that two higher kinds of grades are set up to one element and three lower kinds of grades are set up to another element.

In this regard, it has not been mentioned particularly in each of the embodiments described above. However, the video game processing apparatus (for example, the server 10 or the terminal 20) may be configured so as not to change the rank or grade that have been set up to each of the users from the time after the grade is set up or after the groups are divided to the time when composition of the new group is terminated. This makes it possible to cause each of the users to be aware of his or her own rank and grade at least until a new group is composed. Further, in this case, the video game processing apparatus may be configured so that a specific effect (for example, a change in a parameter) in the video game is generated in accordance with the rank or the grade.

In this regard, it has not been mentioned particularly in each of the embodiments described above. However, the video game processing apparatus (for example, the server 10 or the terminal 20) may be configured so as to: horizontally shuffle the elements corresponding to a predetermined grade with respect to the plurality of groups; and compose a group obtained by the shuffle as a new group. Namely, for example, the video game processing apparatus may be configured so as to: divide the ranks of each of the groups into up to five elements per ten users; number the elements from one to five from the top (element number); in turn apply group numbers to the elements with the same element number; and compose a new group. In this case, the video game processing apparatus is configured so as to: set up group creation for horizontally shuffling the elements as normal group creation; and carry out the group creation by a different method at predetermined timing. Therefore, it is possible to encourage the user in participation in the video game and motivation. As an example of the different method, there is a method of composing a group by collecting the groups on the basis of the same element number.

In this regard, it has not been mentioned particularly in each of the embodiments described above. However, the video game processing apparatus (for example, the server 10 or the terminal 20) may be configured so as to control a rival event between the same groups to create a chance in which members who usually compete through friendly rivalry compete in unison. In this case, for example, the server 10 may be configured so as to compose new groups, and give each of the new groups a task. In this case, the server 10 may be configured so that the task for giving to each of the new groups is determined on the basis of characteristics (a level or a result) of each of the users included in each of the new groups, the total number of users and the like. This makes it possible to provide, to the user, a feeling that the user might probably win.

Further, in each of the embodiments described above, each of the plurality of user terminals 20 and 201 to 20N and the video game processing server 10 carries out the various kinds of processing described above in accordance with various kinds of control programs (for example, a video game processing program) stored in the storage device with which the corresponding terminal or server is provided.

In this regard, the configuration of the video game processing system 100 is not limited to the configuration that has been explained as the example of the respective embodiments described above. For example, the video game processing apparatus may be configured so that part or all of the processing that has been explained as the processing carried out by the user terminal is carried out by the server 10, or it may be configured so that part or all of the processing that has been explained as the processing carried out by the server 10 is carried out by any of the plurality of user terminals 20 and 201 to 20N (for example, the user terminal 20). Further, it may be configured so that a part or all of the storage sections included by the server 10 is included in any of the plurality of user terminals 20 and 201 to 20N. Namely, it may be configured so that a part or all of the functions included in any one of the user terminal 201 and the video game processing server 10 according to the video game processing system 100 is included in the other.

Further, the video game processing program may be configured so as to cause a single apparatus that does not include a communication network to realize a part or all of the functions, which have been explained as the examples of the respective embodiments described above.

Further, in each of the embodiments described above, the word "in accordance with progress of the video game" means that occurrence of various kinds of progress or changes and the like that can be generated in the video game becomes timing or a standard of the processing of specifying. As an example of the processing of specifying, there are a determining process, an information updating process and the like. Further, as examples of the various kinds of progress or changes that can be generated in the video game, there are progress of time, a change in the game element value, a specific status or update of a flag, an operation input by the user, and the like.

APPENDIX

The explanation of the embodiments described above has been described so that the following inventions can be at least realized by a person having a normal skill in the art to which the present invention belongs.

(1)

A non-transitory computer-readable medium including a video game processing program product for causing a server to realize functions to create a rank regarding a video game for each of a plurality of users, wherein the functions includes:

a managing function configured to manage the plurality of users in a state where the plurality of users is grouped into groups by every predetermined number;

a creating function configured to respectively create ranks for the users in each of the groups;

a setting function configured to set up grades for the users in each of the groups on the basis of the ranks of the users;

a dividing function configured to divide the groups into a plurality of elements, the plurality of elements respectively corresponding to the grades; and a composing function configured to compose a new group using the plurality of elements.

(2)

The non-transitory computer-readable medium according to claim (1), wherein the composing function includes a function configured to compose the new group so as to become a result in which at least a part of the plurality of elements is rearranged among the plurality of groups.

(3)

The non-transitory computer-readable medium according to claim (1), wherein the composing function includes a function configured to compose the new group so as to become a result in which the plurality of elements corresponding to the same grade or a plurality of grades that satisfies a predetermined condition is collected.

(4)

The non-transitory computer-readable medium according to any one of claims (1) to (3), wherein the creating function includes a function configured to create the ranks on the basis of game elements acquired within a predetermined period of time by each of the users and a function configured to exclude users who have acquired no game element within the predetermined period of time from a creation target for the ranks.

(5)
The non-transitory computer-readable medium according to any one of claims (1) to (4),
wherein the functions further include a specifying function configured to specify one or more special user who has not been grouped, and
wherein the composing function includes a function configured to assign the one or more special user to the composed new group in a case where the number of special users is less than the predetermined number.

(6)
The non-transitory computer-readable medium according to any one of claims (1) to (5),
wherein the functions further includes:
a specifying function configured to specify a special user who has not been grouped,
wherein the composing function includes a function configured to compose the new group consisted solely of special users in a case where the number of special users is a predetermined number or more.

(7)
The non-transitory computer-readable medium according to any one of claims (1) to (6),
wherein the dividing function includes a function configured to carry out the division in a case where a condition to compose a new group is satisfied.

(8)
The non-transitory computer-readable medium according to any one of claims (1) to (7),
wherein the functions further includes:
an extracting function configured to extract one or more users (hereinafter, referred to as "the associated user group") from at least a part of the users, the one or more users being willing to continuously belong to the same group, and
wherein the composing function includes a function configured to compose the new group using the plurality of elements and the associated user group.

(9)
The non-transitory computer-readable medium according to any one of claims (1) to (8),
wherein a user terminal is caused to realize at least one function of the functions that the server is caused to realize, the user terminal being capable of communicating with the server.

(10)
A server in which the video game processing program described in any of (1) to (9) is installed.

(11)
A video game processing system including a communication network, a server and a user terminal, the video game processing system configured to control progress of a video game by creating a rank regarding the video game for each of a plurality of users, the video game processing system including:
a manager configured to manage the plurality of users in a state where the plurality of users is grouped into groups by every predetermined number;
a creator configured to respectively create ranks for the users in each of the groups;
a setter configured to set up grades for the users in each of the groups on the basis of the ranks of the users;
a divider configured to divide the groups into a plurality of elements, the plurality of elements respectively corresponding to the grades; and
a composer configured to compose a new group using the plurality of elements.

(12)
The video game processing system according to (11),
wherein the server includes the manager, the creator, the setter, the divider, and the composer, and
wherein the user terminal includes an outputter configured to output a game screen on a display screen of a display device, the game screen representing the new group.

(13)
A non-transitory computer-readable medium including a video game processing program product for causing a server to realize a first group of functions to create a rank regarding a video game for each of a plurality of users, the video game processing program further causing a user terminal to realize a second group of functions to carry out the video game,
wherein the first group of functions includes:
a managing function configured to manage the plurality of users in a state where the plurality of users is grouped into groups by every predetermined number;
a creating function configured to respectively create ranks for the users in each of the groups;
a setting function configured to set up grades for the users in each of the groups on the basis of the ranks of the users;
a dividing function configured to divide the groups into a plurality of elements, the plurality of elements respectively corresponding to the grades;
a composing function configured to compose a new group using the plurality of elements; and
a transmitting function configured to transmit output information to the user terminal, the output information representing the new group, and
wherein the second group of functions includes:
a receiving function configured to receive the output information from the server.

(14)
A non-transitory computer-readable medium including a video game processing program product for causing a user terminal to realize functions to create a rank regarding a video game for each of a plurality of users,
wherein the functions includes:
a managing function configured to manage the plurality of users in a state where the plurality of users is grouped into groups by every predetermined number;
a creating function configured to respectively create ranks for the users in each of the groups;
a setting function configured to set up grades for the users in each of the groups on the basis of the ranks of the users;
a dividing function configured to divide the groups into a plurality of elements, the plurality of elements respectively corresponding to the grades; and
a composing function configured to compose a new group using the plurality of elements.

(15)
The non-transitory computer-readable medium according to (14),
wherein a user terminal is caused to realize at least one function of the functions that the server is caused to realize, the user terminal being capable of communicating with the server.

(16)
A user terminal into which the video game processing program product included in the non-transitory computer-readable medium according to (14) or (15) is installed.

(17)
A video game processing method for creating a rank regarding a video game for each of a plurality of users, the video game processing method including:

managing the plurality of users in a state where the plurality of users is grouped into groups by every predetermined number;

respectively creating ranks for the users in each of the groups;

setting up grades for the users in each of the groups on the basis of the ranks of the users;

dividing the groups into a plurality of elements, the plurality of elements respectively corresponding to the grades; and composing a new group using the plurality of elements.

(18) A video game processing method of a video game processing system for realizing functions to create a rank regarding a video game for each of a plurality of users, the video game processing system comprising a communication network, a server, and a user terminal, the video game processing method comprising:

managing the plurality of users in a state where the plurality of users is grouped into groups by every predetermined number;

respectively creating ranks for the users in each of the groups;

setting up grades for the users in each of the groups on the basis of the ranks of the users;

dividing the groups into a plurality of elements, the plurality of elements respectively corresponding to the grades; and composing a new group using the plurality of elements.

According to one of the embodiments of the present invention, it is useful to allow to create ranking capable of causing a user to attract his or her interest in a game result of other user.

What is claimed is:

1. A non-transitory computer-readable medium including a video game processing program product for causing a server to realize functions to create a rank regarding a video game for each of a plurality of users,
    wherein the functions includes:
        a managing function configured to manage, in a storage of the server, the plurality of users in a state where the plurality of users is grouped into groups by every predetermined number;
        a creating function configured to respectively create, by the server, ranks for users in each of the groups;
        a setting function configured to set up, by the server, grades for the users in each of the groups on a basis of the ranks of the users;
        a dividing function configured to divide, by the server, the groups into a plurality of elements, the plurality of elements respectively corresponding to the grades; and
        a composing function configured to compose, by the server, a new group using the plurality of elements.

2. The non-transitory computer-readable medium according to claim 1,
    wherein the composing function includes a function configured to compose the new group so as to become a result in which at least a part of the plurality of elements is rearranged among the groups.

3. The non-transitory computer-readable medium according to claim 1,
    wherein the creating function includes a first function configured to create the ranks on a basis of game elements acquired within a predetermined period of time by each of the users and a second function configured to exclude users who have acquired no game element within the predetermined period of time from a creation target for the ranks.

4. The non-transitory computer-readable medium according to claim 1,
    wherein the functions further include a specifying function configured to specify at least one special user who has not been grouped, and
    wherein the composing function includes a function configured to assign the at least one special user to the composed new group in a case where a number of special users is less than the predetermined number.

5. The non-transitory computer-readable medium according to claim 1,
    wherein the composing function includes a function configured to compose the new group so as to become a result in which the plurality of elements corresponding to a same grade or a plurality of grades that satisfies a predetermined condition is collected.

6. The non-transitory computer-readable medium according to claim 1,
    wherein the functions further include a specifying function configured to specify a special user who has not been grouped, and
    wherein the composing function includes a function configured to compose the new group consisted solely of special users in a case where a number of special users is at least a predetermined number.

7. The non-transitory computer-readable medium according to claim 1,
    wherein the dividing function includes a function configured to carry out division in a case where a condition to compose a new group is satisfied.

8. The non-transitory computer-readable medium according to claim 1,
    wherein the functions further include an extracting function configured to extract at least one user as an associated user group from at least a part of the users, the at least one user being willing to continuously belong to a same group, and
    wherein the composing function includes a function configured to compose the new group using the plurality of elements and the associated user group.

9. The non-transitory computer-readable medium according to claim 1,
    wherein a user terminal is caused to realize at least one function of the functions that the server is caused to realize, the user terminal being configured to communicate with the server.

10. The non-transitory computer-readable medium according to claim 1,
    wherein the predetermined number is changeable based on a server load.

11. The non-transitory computer-readable medium according to claim 1,
    wherein the setting function sets up the grades for the users in accordance with a dedicated rule.

12. The non-transitory computer-readable medium according to claim 11,
    wherein the setting function sets up the grades for the users in each of the groups by dividing the users in each of the groups into a predetermined number of categories.

13. The non-transitory computer-readable medium according to claim 12,
    wherein, in each of the groups, a number of users in each of the predetermined number of the categories is same.

14. The non-transitory computer-readable medium according to claim 1,
wherein, in the dividing function, users having a grade which satisfies a predetermined condition are treated as a bundle.

15. The non-transitory computer-readable medium according to claim 1,
wherein, in the dividing function, a condition for dividing the plurality of elements into the plurality of elements includes users for whom a same grade is set up.

16. The non-transitory computer-readable medium according to claim 1,
wherein the composing function composes new groups of a same number before a dividing by the dividing function.

17. A video game processing system configured to control progress of a video game by creating a rank regarding the video game for each of a plurality of users, the video game processing system comprising:
a server connected to a communication network; and
a user terminal connected to the communication network, wherein the server is configured to:
manage the plurality of users in a state where the plurality of users is grouped into groups by every predetermined number;
respectively create ranks for users in each of the groups;
set up grades for the users in each of the groups on a basis of the ranks of the users;
divide the groups into a plurality of elements, the plurality of elements respectively corresponding to the grades; and
compose a new group using the plurality of elements.

18. The video game processing system according to claim 17,
wherein the predetermined number is changeable based on a server load.

19. A non-transitory computer-readable medium including a video game processing program product for causing a server to realize a first group of functions to create a rank regarding a video game for each of a plurality of users, the video game processing program further causing a user terminal to realize a second group of functions to carry out the video game,
wherein the first group of functions includes:
a managing function configured to manage, in a storage of the server, the plurality of users in a state where the plurality of users is grouped into groups by every predetermined number;
a creating function configured to respectively create, by the server, ranks for users in each of the groups;
a setting function configured to set up, by the server, grades for the users in each of the groups on a basis of the ranks of the users;
a dividing function configured to divide, by the server, the groups into a plurality of elements, the plurality of elements respectively corresponding to the grades;
a composing function configured to compose, by the server, a new group using the plurality of elements; and
a transmitting function configured to transmit, by the server, output information to the user terminal, the output information representing the new group, and
wherein the second group of functions includes:
a receiving function configured to receive, by the user terminal, the output information from the server.

20. The non-transitory computer-readable medium according to claim 19,
wherein the predetermined number is changeable based on a server load.

\* \* \* \* \*